US008239288B2

(12) United States Patent
Asikainen

(10) Patent No.: US 8,239,288 B2
(45) Date of Patent: Aug. 7, 2012

(54) METHOD, MEDIUM, AND SYSTEM FOR PROVIDING A RECOMMENDATION OF A MEDIA ITEM

(75) Inventor: Joonas Asikainen, Zurich (CH)

(73) Assignee: Rovi Technologies Corporation, Santa Clara, CA (US)

( * ) Notice: Subject to any disclaimer, the term of this patent is extended or adjusted under 35 U.S.C. 154(b) by 205 days.

(21) Appl. No.: 12/776,924

(22) Filed: May 10, 2010

(65) Prior Publication Data

US 2011/0276512 A1    Nov. 10, 2011

(51) Int. Cl.
 *G06Q 30/00* (2006.01)
(52) U.S. Cl. .................................................... 705/26.7
(58) Field of Classification Search ............... 705/26.7, 705/347, 26.1; 707/723
See application file for complete search history.

(56) References Cited

U.S. PATENT DOCUMENTS

| 5,790,426 | A  | * | 8/1998  | Robinson ........................ 702/179 |
| 5,884,282 | A  | * | 3/1999  | Robinson ........................ 705/7.33 |
| 6,933,433 | B1 | * | 8/2005  | Porteus et al. .................... 84/615 |
| 2009/0307296 | A1 | * | 12/2009 | Gibbs et al. ..................... 709/201 |

OTHER PUBLICATIONS

Jamali et al., "TrustWalker: A Random Walk Model for Combining Trust-based and Item-based Recommendation", 2009.*
PCT International Search Report, dated Aug. 5, 2011 in corresponding International Application No. PCT/US2011/035129.
Written Opinion of the International Searching Authority, dated Aug. 5, 2011 in corresponding International Application No. PCT/US2011/035129.
Asikainen, "Statistical Properties of Random Fractals: Geometry, Growth and Interface Dynamics", 2002.

* cited by examiner

*Primary Examiner* — Matthew Zimmerman
(74) *Attorney, Agent, or Firm* — Fitzpatrick, Cella, Harper & Scinto

(57) ABSTRACT

A processor retrieves, from a database, an identifier of a first media item rated by a target user, user identifiers of users having provided media item ratings for the first media item, and the media item ratings provided by the users, correspondingly. Each of the media item ratings is randomized, resulting in randomized media item ratings. A user identifier corresponding to a maximum of the randomized media item ratings is selected from the user identifiers. Additional media item ratings associated with the selected user identifier are retrieved from the database. Each of the additional media item ratings are randomized, resulting in additional randomized media item ratings. An identifier of a recommended media item corresponding to a maximum of the randomized media item ratings and the additional randomized media item ratings is selected. Metadata associated with the recommended media item is transmitted to a user device over a network.

12 Claims, 6 Drawing Sheets

METHOD, MEDIUM, AND SYSTEM FOR PROVIDING A RECOMMENDATION OF A MEDIA ITEM

BACKGROUND

1. Field

Example aspects of the present invention generally relate to media item recommendations, and more particularly to systems, methods, and computer program products for providing a recommendation of a media item.

2. Related Art

The digitization of music, movies, and games, as well as the improvement in electronic delivery techniques, have changed the way consumers experience such media content. Consumers can download digital music, movies, or games via the Internet with the click of a mouse, and can enjoy them at their convenience. Consumers can also have media content streamed from a Web site to a consumer device, such as a computer, a television, or portable device, upon demand.

In addition, the variety of media content available to consumers today is wider than ever. Consumers can browse vast collections of music, movies, and games via Internet or television browsers to identify a particular media item to download or stream. Locating desired media items within these collections, however, can be difficult given their enormity.

To avoid the need for consumers to browse these vast collections, content providers provide consumers with recommendations of media items. Recommending media items to consumers promotes the discovery of new media items and increases consumer satisfaction with the content provider.

One conventional approach to providing consumers with recommendations of media items has been to compute an explicit numerical similarity for each pair of media items based on underlying media item attributes. Media items are then recommended based on the computed similarities. This approach, however, requires substantial computing resources and is inefficient for vast collections of media items.

BRIEF DESCRIPTION

Given the foregoing, it would be useful to have an efficient system for providing recommendations of media items.

The example embodiments described herein meet the above-identified needs by providing systems, methods, and computer program products for providing a recommendation of a media item. The system includes a processor that retrieves, from a database, an identifier of a first media item rated by a target user, user identifiers of users having provided media item ratings for the first media item, and the media item ratings provided by the users, correspondingly. Each of the media item ratings is randomized, resulting in randomized media item ratings. A user identifier corresponding to a maximum of the randomized media item ratings is selected from the user identifiers. Additional media item ratings associated with the selected user identifier are retrieved from the database. Each of the additional media item ratings are randomized, resulting in additional randomized media item ratings. An identifier of a recommended media item corresponding to a maximum of the randomized media item ratings and the additional randomized media item ratings is selected. Metadata associated with the recommended media item is transmitted to a user device over a network.

In another aspect, the processor identifies a plurality of media item recommendations for the target user, and computes frequencies of occurrence for each identified media item recommendation, and transmits, to the user device over the network, a media item recommendation corresponding to a maximum of the frequencies of occurrence.

In yet another aspect, randomizing media item ratings includes at least one of adding degrees of randomization to the media item ratings, subtracting degrees of randomization from the media item ratings, multiplying degrees of randomization by the media item ratings, and dividing degrees of randomization by the media item ratings, correspondingly, wherein the degrees of randomization include at least one of an integer and a real-valued number.

Further features and advantages, as well as the structure and operation, of various example embodiments of the present invention are described in detail below with reference to the accompanying drawings.

BRIEF DESCRIPTION OF THE DRAWINGS

The features and advantages of the example embodiments presented herein will become more apparent from the detailed description set forth below when taken in conjunction with the drawings.

DETAILED DESCRIPTION

I. Definitions

Figure 1:
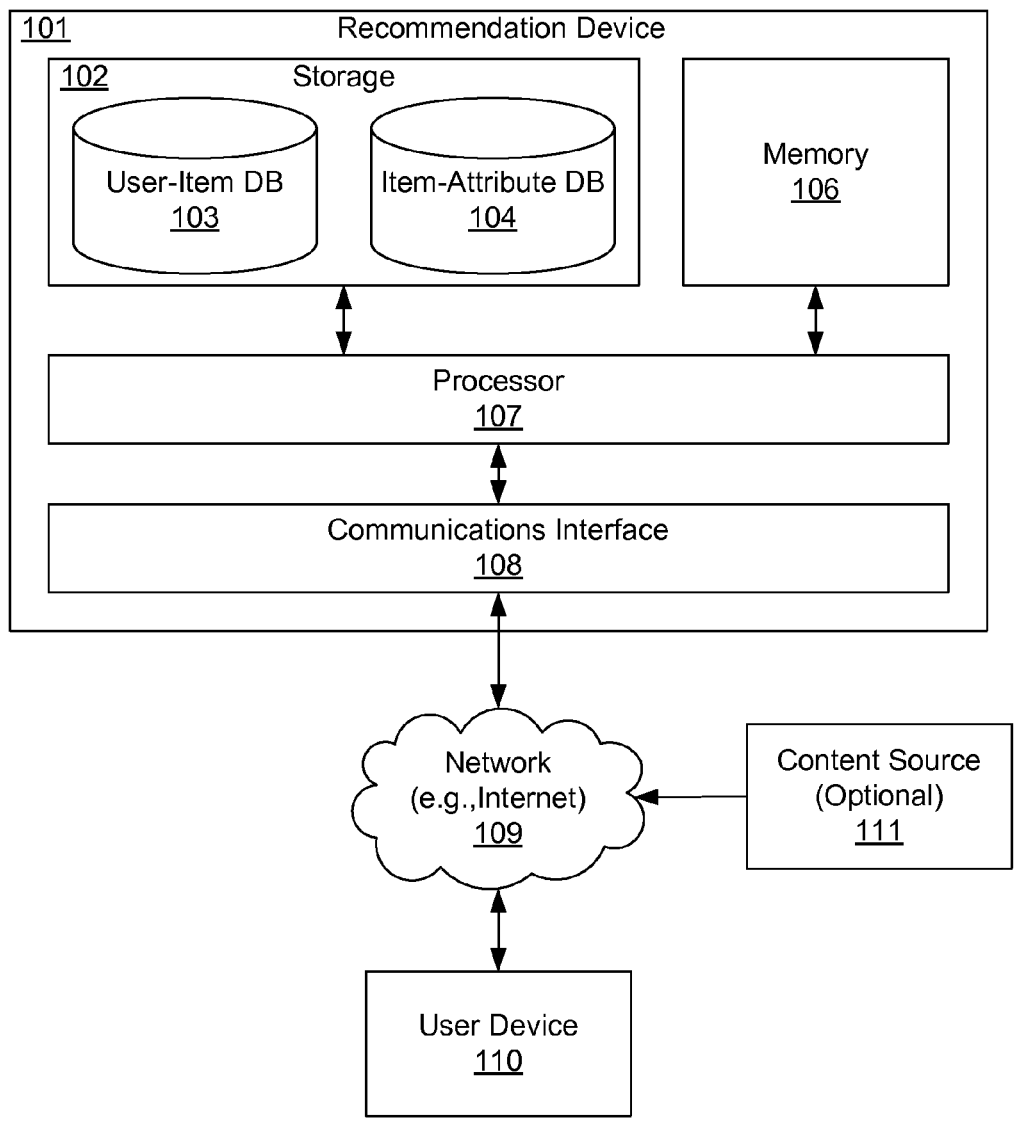
FIG. 1 is a system diagram of an exemplary media item recommendation system in which some embodiments are implemented.

Some terms are defined below in alphabetical order for easy reference. These terms are not rigidly restricted to these definitions. A term may be further defined by its use in other sections of this description.

"Database" means a collection of data organized in such a way that a computer program may quickly select desired pieces of the data. A database is an electronic filing system. In some implementations, the term "database" may be used as shorthand for "database management system".

"Degree of randomization" generally means a numerical value indicating an extent to which an original numerical value (e.g., a media item rating, a media item attribute strength, etc.) has been randomized. Randomization is described in further detail below.

"Device" means software, hardware, or a combination thereof. A device may sometimes be referred to as an apparatus. Examples of a device include without limitation a software application such as Microsoft Word™, a laptop computer, a database, a server, a display, a computer mouse, and a hard disk. Each device is configured to carry out one or more steps of the method of storing an internal identifier in metadata.

"Link" means an association between two or more objects or elements in memory. A link can be, for example, a pointer or a variable that contains the address of a location in memory, where the location is the starting point of an allocated object or the element of an array. The memory may be located on a database or a database system. "Linking" means associating (e.g., by pointing to) objects in memory.

"Media item" means any item of media content, such as a song, a movie, a game, a television show, and music or videos of various types. A media item can be recorded in many different formats, and may have many different versions.

"Media item attribute" means any characteristic of a media item. Each media item attribute corresponds to a particular media item attribute category.

"Media item attribute category" means a grouping of related media item attributes. Example media item attribute categories and media item attributes for music include cognitive attributes (e.g., simplicity, storytelling quality, melodic emphasis, vocal emphasis, speech like quality, strong beat, good groove, fast pace), emotional attributes (e.g., intensity, upbeatness, aggressiveness, relaxing, mellowness, sadness, romance, broken heart), aesthetic attributes (e.g., smooth vocals, soulful vocals, high vocals, sexy vocals, powerful vocals, great vocals), social behavioral attributes (e.g., easy listening, wild dance party, slow dancing, workout, shopping mall), genre attributes (e.g., alternative, blues, country, electronic/dance, folk, gospel, jazz, Latin, new age, R&B/soul, rap/hip hop, reggae, rock), sub-genre attributes (e.g., blues, gospel, motown, stax/memphis, philly, doo-wop, funk, disco, old school, blue-eyed soul, adult contemporary, quiet storm, crossover, dance/techno, electro/synth, new jack swing, retro/alternative, hip hop, rap), instrumental/vocal attributes (e.g., instrumental, vocal, female vocalist, male vocalist), backup vocal attributes (e.g., female vocalist, male vocalist), instrument attributes (e.g., most important instrument, second most important instrument), etc.

Examples of media item attribute categories and attributes for movies include genre (e.g., action, animation, children and family, classics, comedy, documentary, drama, faith and spirituality, foreign, high definition, horror, independent, musicals, romance, science fiction, television, thrillers), release date (e.g., within past six months, within past year, 1980s), etc.

Other media item attribute categories and media item attributes are contemplated and are within the scope of the embodiments described herein.

"Media item attribute strength" means a numerical value assigned to a media item to indicate the degree to which the media item is characterized by a particular media item attribute. Media item attribute strengths may be integers, real-valued numbers, and/or the like. Example media item attribute strengths include strengths from one (the media item is not characterized by the media item attribute at all) to five (the media item is characterized by the media item attribute very much).

"Media item rating" means a numerical value indicating the degree to which a user enjoys a particular media item. Media item ratings may be explicitly assigned by a user to a media item. For example, users can rate media items on a scale from one (the user did not enjoy the media item at all) to five (the user enjoyed the media item very much). Media item ratings may also be implicitly computed by aggregating the interaction of a user with media items on a Web site. For example, the fact that a user selected to skip playback of a particular media item may be used to compute a low media item rating for that media item.

"Metadata" generally means data that describes data. More particularly, metadata may be used to describe the contents of digital recordings. Such metadata may include, for example, a track name, a song name, artist information (e.g., name, birth date, discography), album information (e.g., album title, review, track listing, sound samples), relational information (e.g., similar artists and albums, genre) and/or other types of supplemental information such as advertisements, links or programs (e.g., software applications), and related images. Metadata may also include a program guide listing of the songs or other audio content associated with multimedia content. Conventional optical discs (e.g., CDs, DVDs, Blu-ray Discs) do not typically contain metadata. Metadata may be associated with a digital recording (e.g., song, album, movie, or video) after the digital recording has been ripped from an optical disc, converted to another digital audio format and stored on a hard drive.

"Network" means a connection between any two or more computers, which permits the transmission of data. A network may be any combination of networks, including without limitation the Internet, a local area network, a wide area network, a wireless network, and a cellular network.

"Randomization" generally means a procedure of randomly modifying an original numerical value, such as a media item rating, a media item attribute strength, and the like, resulting in a randomized numerical value. An example randomization procedure includes adding a degree of randomization, such as a number randomly selected from a finite range of numbers, to an original numerical value. Other example randomization procedures include performing other arithmetical calculations, such as subtraction, multiplication, or division, on random numbers and original numerical values. Randomization is described in further detail below.

"Server" means a software application that provides services to other computer programs (and their users), in the same or another computer. A server may also refer to the physical computer that has been set aside to run a specific server application. For example, when the software Apache HTTP Server is used as the Web server for a company's Web site, the computer running Apache is also called the Web server. Server applications can be divided among server computers over an extreme range, depending upon the workload.

"Software" means a computer program that is written in a programming language that may be used by one of ordinary skill in the art. The programming language chosen should be compatible with the computer on which the software application is to be executed and, in particular, with the operating system of that computer. Examples of suitable programming languages include without limitation Object, Pascal, C, C++ and Java. Further, the functions of some embodiments, when described as a series of steps for a method, could be implemented as a series of software instructions for being operated by a processor, such that the embodiments could be implemented as software, hardware, or a combination thereof. Computer-readable media are discussed in more detail in a separate section below.

"Song" means a musical composition. A song is typically recorded onto a track by a record label (e.g., recording company). A song may have many different versions, for example, a radio version and an extended version.

"System" means a device or multiple coupled devices. A device is defined above.

"User" means a consumer, client, and/or client device in a marketplace of products and/or services.

"User device" (e.g., a client, a client device, a user computer) is a hardware system, a software operating system and/or one or more software application programs. A user device may refer to a single computer or to a network of interacting computers. A user device may be the client part of a client-server architecture. A user device typically relies on a server to perform some operations. Examples of a user device include without limitation a television, a CD player, a DVD player, a Blu-ray Disc player, a personal media device, a portable media player, an iPod™, a Zoom Player, a laptop computer, a palmtop computer, a smart phone, a cell phone, a mobile phone, an MP3 player, a digital audio recorder, a digital video recorder, an IBM-type personal computer (PC) having an operating system such as Microsoft Windows™, an Apple™ computer having an operating system such as MAC-OS, hardware having a JAVA-OS operating system, and a Sun Microsystems Workstation having a UNIX operating system.

"Web browser" means any software program which can display text, graphics, or both, from Web pages on Web sites. Examples of a Web browser include without limitation Mozilla Firefox™ and Microsoft Internet Explorer™

"Web page" means any documents written in mark-up language including without limitation HTML (hypertext mark-up language) or VRML (virtual reality modeling language), dynamic HTML, XML (extended mark-up language) or related computer languages thereof, as well as to any collection of such documents reachable through one specific Internet address or at one specific Web site, or any document obtainable through a particular URL (Uniform Resource Locator).

"Web server" refers to a computer or other electronic device which is capable of serving at least one Web page to a Web browser. An example of a Web server is a Yahoo™ Web server.

"Web site" means at least one Web page, and more commonly a plurality of Web pages, virtually coupled to form a coherent group.

II. Overview

Systems, methods, apparatus and computer-readable media are provided for recommending a media item. In one aspect, a processor retrieves, from a database, an identifier of a first media item rated by a target user, user identifiers of users having provided media item ratings for the first media item, and the media item ratings provided by the users, correspondingly. Each of the media item ratings is randomized, resulting in randomized media item ratings. A user identifier corresponding to a maximum of the randomized media item ratings is selected from the user identifiers. Additional media item ratings associated with the selected user identifier are retrieved from the database. Each of the additional media item ratings are randomized, resulting in additional randomized media item ratings. An identifier of a recommended media item corresponding to a maximum of the randomized media item ratings and the additional randomized media item ratings is selected. Metadata associated with the recommended media item is transmitted to a user device over a network.

In another aspect, the processor identifies a plurality of media item recommendations for the target user, and computes frequencies of occurrence for each identified media item recommendation, and transmits, to the user device over the network, a media item recommendation corresponding to a maximum of the frequencies of occurrence.

In yet another aspect, randomizing media item ratings includes at least one of adding degrees of randomization to the media item ratings, subtracting degrees of randomization from the media item ratings, multiplying degrees of randomization by the media item ratings, and dividing degrees of randomization by the media item ratings, correspondingly, wherein the degrees of randomization include at least one of an integer and a real-valued number.

Exemplary aspects and embodiments are now described in more detail herein in terms of a recommendation device that executes program code to identify media item recommendations and provide the media item recommendations to a user device over a network. This is for convenience only and is not intended to limit the application of the present description. In fact, after reading the following description, it will be apparent to one skilled in the relevant art(s) how to implement the following invention in alternative embodiments such as, for example, by using a recommendation device that is incorporated within a content source to audibly and/or visibly reproduce a recommended media item for a user.

III. System Architecture

FIG. 1 is a system diagram of an exemplary media item recommendation system 100 in which some embodiments are implemented. The system 100 includes a recommendation device 101, a network 109, a user device 110, and, optionally, a content source 111.

The recommendation device 101 includes a processor 107, which is communicatively coupled through a communication infrastructure (not shown) to a communications interface 108, a memory 106, and a storage device 102. In general, the recommendation device 101 provides the user device 110 with recommendations of media items over the network 109. As described in further detail below with respect to FIGS. 3 and 5, the processor 107 executes instructions to identify a media item identifier stored in the storage device 102 and recommend the corresponding media item to a user of the user device 110. In some embodiments, the processor 107 uses the memory 106 as temporary storage during execution of the instructions.

The storage device 102 (also sometimes referred to as "secondary memory") includes a user-item database 103 and an item-attribute database 104.

The user-item database 103 is a collection of data representing users, media items, and the associations or links between users and media items. In particular, the user-item database 103 stores user profiles, which include user identifiers, a list of media items rated by each user and the corresponding media item ratings. The information stored in the user-item database 103 can be represented as a user-item diagram, which is described in further detail below with respect to FIG. 2.

Media item ratings, which are defined above, may be explicitly or implicitly determined. In an exemplary embodiment, media item ratings are selected by users from a scale, such as a scale from one (denoting that the user does not enjoy the media item at all) to five (denoting that the user enjoys the media item very much). Users input media item ratings into the user-item database 203 via the user device 110 over the network 109. Alternatively, or in addition, the processor 107 retrieves media item ratings from a commercially available database of media item ratings and stores them in the user-item database 203. In general, the processor 107 identifies a media item to recommend to a particular user by using data within the user-item database 103, as described in further detail below in connection with FIGS. 2 and 3.

The item-attribute database 104 is a collection of data representing media items, media item attributes, and the associations or links between media items and media item attributes. More particularly, the item-attribute database 104 includes media item profiles corresponding to a particular media item. Each media item profile associates a unique media item identifier with its media item attribute categories, media item attributes, and numerical media item attribute strengths assigned to each media item attribute. The information stored in the item-attribute database 104 can be represented by an item-attribute diagram, which is described in further detail below with respect to FIG. 4. In general, the processor 107 uses the item-attribute database 104 to identify a media item to recommend to a user according to a particular media item attribute, as described in further detail below in connection with FIG. 5.

The user-item database 103 and the item-attribute database 104 may be combined into a single database or divided into multiple distinct databases and still be within the scope of the embodiments described herein.

The storage device 102 may also include, for example, a hard disk drive and/or a removable storage drive, representing a disk drive, a magnetic tape drive, an optical disk drive, etc. As will be appreciated, the storage device 102 may include a computer-readable storage medium having stored thereon computer software and/or data.

In alternative embodiments, the storage device 102 may include other similar devices for allowing computer programs or other instructions to be loaded into the recommendation device 101. Such devices may include, for example, a removable storage unit and an interface, a program cartridge and cartridge interface such as that found in video game devices, a removable memory chip such as an erasable programmable read only memory (EPROM), or programmable read only memory (PROM) and associated socket, and other removable storage units and interfaces, which allow software and data to be transferred from the removable storage unit to the recommendation device 101.

The communications interface 108 provides the recommendation device 101 with connectivity to the network 109, which may be a proprietary network, the Internet, or the like. In particular, the communications interface 108 enables the recommendation device 101 to communicate recommendations of media items to the user device 110 via the network 109. The communications interface 108 also allows software and data to be transferred between the recommendation device 101 and external devices. Examples of the communications interface 108 may include a modem, a network interface such as an Ethernet card, a communications port, a Personal Computer Memory Card International Association (PCMCIA) slot and card, etc. Software and data transferred via the communications interface 108 are in the form of signals which may be electronic, electromagnetic, optical, or other signals capable of being received by the communications interface 108. These signals are provided to and/or from the communications interface 108 via a communications path, such as a channel. This channel carries signals and may be implemented by using wire, cable, fiber optics, a telephone line, a cellular link, an RF link, and/or other suitable communications channels.

The user device 110 is a device having a user-interface through which recommendation of media items are presented to a user. Examples of the user device 110 include a personal computer, a laptop computer, a television, a portable media player, etc. A user also can interface with the user device 110 to request recommendations from the recommendation device 101, input media item ratings over the network 109, or interact with any components of the system 100, etc.

In some embodiments, the user device 110 audibly and/or visibly reproduces media content for a user. In these embodiments, the media items recommended by the recommendation device 101 can be provided to the user device 110 by the content source 111.

IV. Collaborative Filtering-Based Recommendations

A. Overview

In general, collaborative filtering is performed by evaluating media item ratings obtained from a group of reviewers and using the ratings to determine a media item to recommend to a target user. In particular, a user-item database is queried to identify media items having media item ratings input by other users with preferences similar to the preferences of the target user, as described in further detail below with respect to FIGS. 2 and 3.

B. User-Item Database

Figure 2:
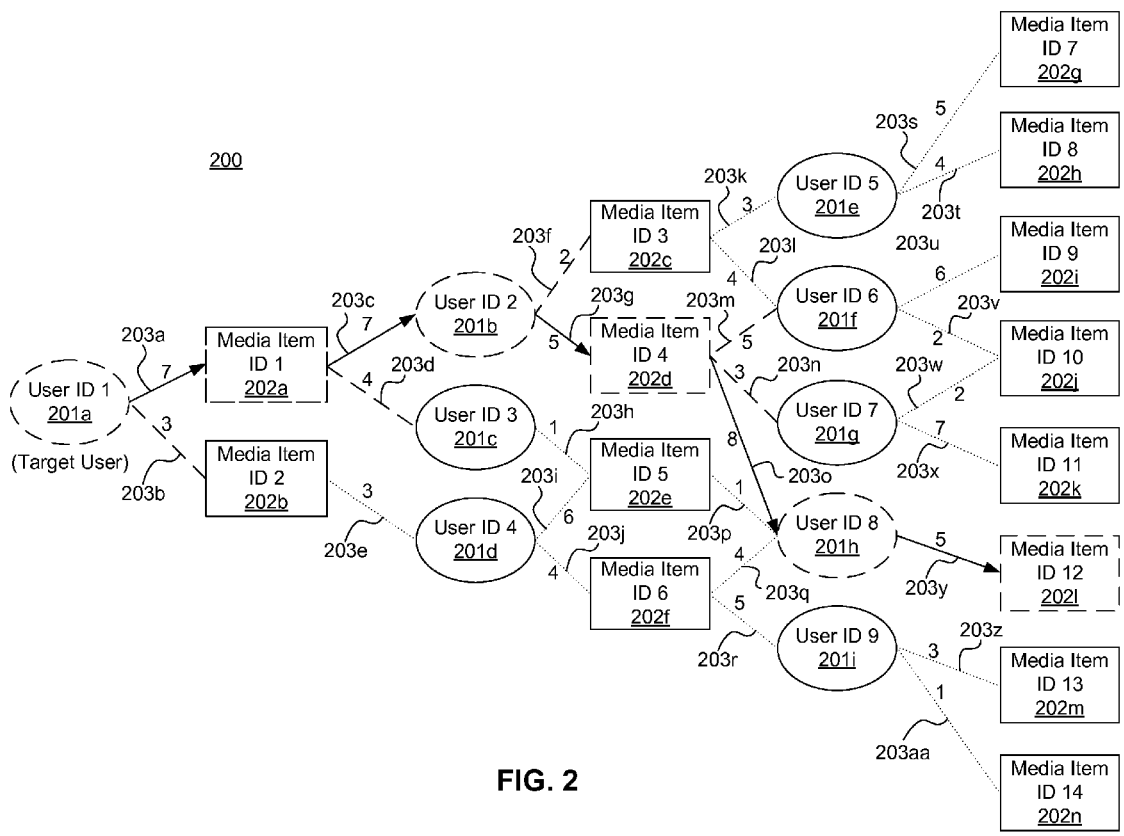
FIG. 2 is a user-item diagram illustrating information stored in a user-item database.

FIG. 2 is a user-item diagram 200 illustrating information stored in a user-item database, such as the user-item database 103. As described above with respect to FIG. 1, the user-item database 103 includes user profiles for each user, with each user profile having a corresponding unique user identifier. An example of such a user profile is shown below in Table 1.

TABLE 1

| User ID 1 | Optional User Attribute(s) |
|---|---|
| Media Item ID 1 | Media Item Rating 1 |
| Media Item ID 2 | Media Item Rating 2 |
| Media Item ID 3 | Media Item Rating 3 |

Each user profile associates a user identifier with media item identifiers of media items the corresponding user has rated, as well as numerical media item ratings the user has assigned to the rated media items. These associations are illustrated in the user-item diagram 200 by links that connect user identifiers 201a, 201b, 201c, 201d, 201e, 201f, 201g, 201h, 201i (collectively 201) to media item identifiers 202a, 202b, 202c, 202d, 202e, 202f, 202g, 202h, 202i, 202j, 202k, 202l, 202m, 202n (collectively 202).

As described in further detail below with respect to FIG. 3, the solid-lined links in the user-item diagram 200 represent links to media item identifiers and user identifiers selected by the processor 107 during the implementation of procedure 300. The long-dashed links in the user-item diagram 200 represent links to media item identifiers and user identifiers retrieved, but not selected, by the processor 107 during the implementation of procedure 300. The short-dashed links in the user-item diagram 200 represent links to media item identifiers and user identifiers that have not been retrieved by the processor 107 during the implementation of procedure 300.

Adjacent to the links in the user-item diagram 200 are numbers that represent the media item ratings 203a, 203b, 203c, 203d, 203e, 203f, 203g, 203h, 203i, 203j, 203k, 203l, 203m, 203n, 203o, 203p, 203q, 203r, 203s, 203t, 203u, 203v, 20w, 203x, 203y, 203z, 203aa (collectively 203). The media item ratings 203 illustrated in the user-item diagram 200 include degrees of randomization, which are described in further detail below.

C. Collaborate Filtering-Based Recommendation Process

Figure 3:
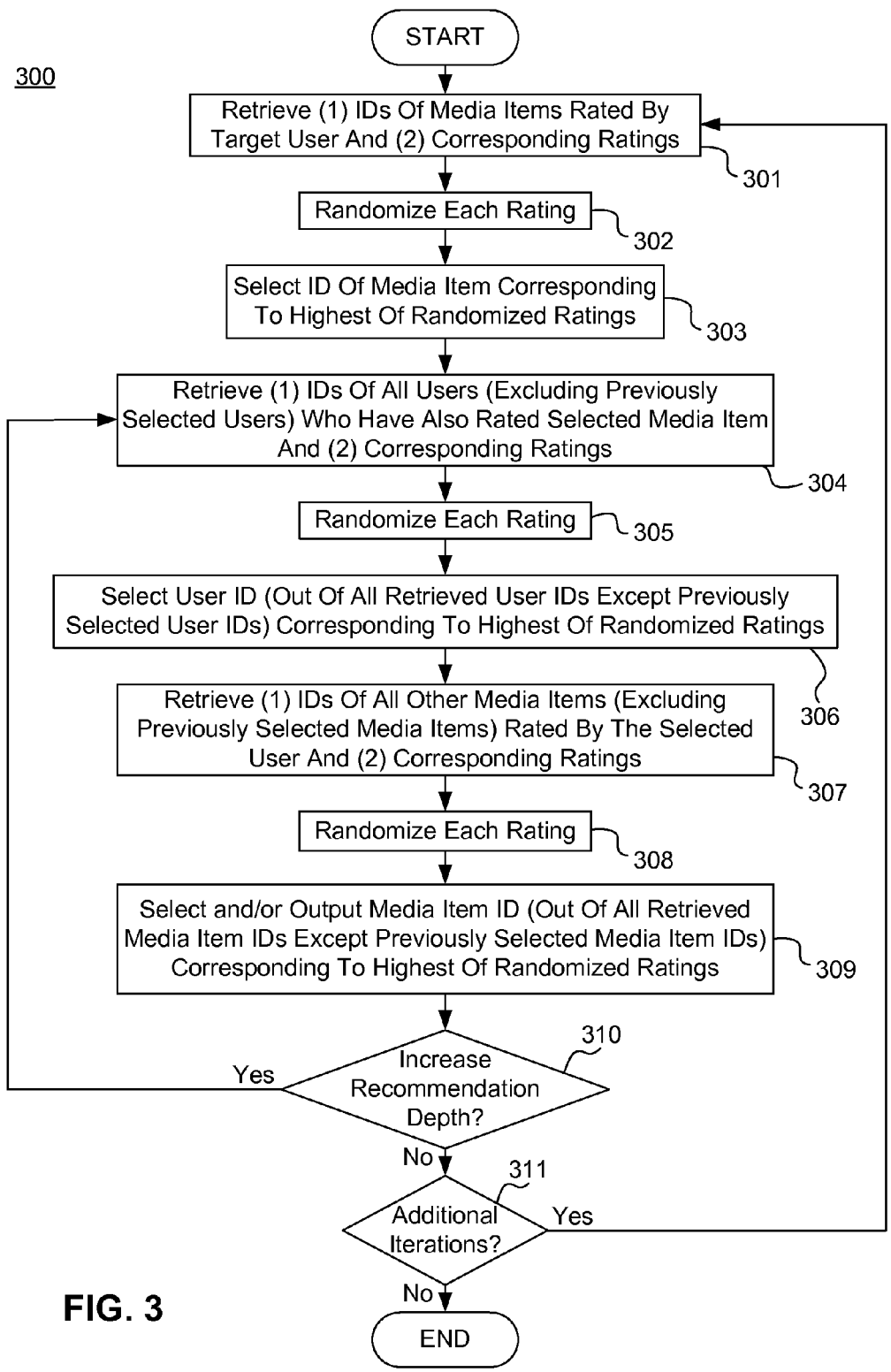
FIG. 3 is a flowchart diagram illustrating an exemplary procedure for providing a media item recommendation by using a network of users and media items.

FIG. 3 is a flowchart diagram illustrating an exemplary procedure 300 for providing a media item recommendation by using a user-item diagram, such as the user-item diagram 200.

The user 201a, which is also sometimes referred to as a target user, is the user for which the recommendation device 101 provides a media item recommendation. Referring to FIGS. 1-3, initially, at block 301, the processor 107 retrieves a list of all the identifiers of media items 202a and 202b that have been rated by the target user 201a as well as the corresponding media item ratings 203a and 203b the target user 201a has assigned to each rated media item 202a and 202b (also sometimes collectively referred to as "target user preferences").

At block 302, the processor 107 randomizes each media item rating by adding a degree of randomization, which, in an exemplary embodiment, is a number randomly selected from a finite range of numbers and added to the user-provided media item ratings. An example finite range from which the random number is selected is a range from zero to fifty percent of the highest media item rating (e.g., from zero to two for a scale of one to five). The example media item ratings 203 shown in FIG. 2 are selected by users from a scale of one to five and include degrees of randomization (not shown) ranging from zero to two. Thus, the randomized media item ratings 203 of FIG. 2 range from one to seven.

Media item rating inaccuracies, which may sometimes be referred to as a margin of error, result from various factors such as mistaken or unintentional media item ratings, mood swings of users, the lack of granularity of the discrete rating scale, etc. In the case of media item ratings implicitly computed from user interactions with computer systems, the margin of error can be particularly large. The effects of media item rating inaccuracies are reduced by the randomization. In addition, because the procedure 300 proceeds on the path having the highest media item rating, randomizing the media item ratings ensures wider sampling over paths in the user-item diagram 200, particularly paths having high media item ratings but slightly less than the highest possible media item rating. Randomization also enables the procedure 300 to encounter media items that do not have the highest media item ratings, but which may nonetheless lead to other highly rated media items that provide good recommendations. Additionally, randomization promotes a wide variety of media item recommendations. Without randomization, media items which have not been rated very highly would rarely be recommended. With randomization, however, media items which have not been highly rated may become more likely to be recommended after a degree of randomization has been added. For example, if users rated media items on a discrete scale from one to five, most often only media items having ratings of five would be recommended. If those media items were randomized, however, some media items having ratings of three or four may become ratings of five after being randomized, thus increasing their chance of being recommended.

For illustrative purposes, randomization uses the same units as the ratings. Other types of rating factors, however, can be added to the ratings as well by using, for example, normalization or constant factors, which need not be linear.

At block 303, the processor 107 selects, from the list of media items 202a and 202b rated by the target user 201a, an identifier of the media item 202a to which the target user 201a has assigned the highest (randomized) media item rating 203a, which is seven in this example. The processor 107 thus identifies a media item 202a that the target user 201a enjoys very much.

At block 304, the processor 107 retrieves identifiers of all the users 201b, 201c, 201d (other than the identifier of the target user 201a) who also have rated the media item 202a that was selected at block 303.

At block 305, the processor 107 randomizes each of the media item ratings 203c and 203d that the users 201b and 201c, respectively, have assigned to the media item 202a. Randomization is described in further detail above with respect to block 302. As described above, the media item ratings 203c and 203d depicted in FIG. 2, which were selected by users 201b and 201c from a scale of one to five, have been randomized to a scale of one to seven.

At block 306, the processor 107 selects, from a list of all user identifiers that have been retrieved thus far (other than any user identifier that has already been selected), an identifier of the user 201b corresponding to the highest randomized media item rating 203c, which is seven in this example. In this way, the processor 107 links the target user 201a with the user 201b having similar media item preferences, e.g., that has assigned a high media item rating to the media item 202a, which the target user 201a also has rated highly.

At block 307, the processor 107 retrieves identifiers of all the other media items 202c and 202d that have been rated by the user 201b selected at block 306, as well as the media item ratings 203f and 203g that user 201b has assigned to the media items 202c and 202d, respectively.

At block 308, the processor 107 randomizes each media item rating 203f and 203g, as described in further detail above with respect to block 302. As described above, the media item ratings 203f and 203g depicted in FIG. 2, which were selected by user 201b from a scale of one to five, have been randomized to a scale of one to seven.

At block 309, the processor 107 selects, from a list of media item identifiers that have been retrieved thus far (other than any media item identifiers that has already been selected), an identifier of the media item 202d corresponding to the highest randomized media item rating 203g, which is five in this example.

In another embodiment, at block 306, the processor 107 selects, from a list of user identifiers retrieved at block 304, an identifier of the user 201b corresponding to the highest randomized media item rating 203c. In addition, or alternatively, at block 309, the processor 107 selects, from a list of media item identifiers retrieved at block 307, an identifier of the media item 202d corresponding to the highest randomized media item rating 203g.

1. Recommendation Depth

Recommendation depth is the number of iterations of blocks 304, 305, 306, 307, 308, 309 that are performed. The number of steps defines the depth of the process. The media item 202d represents an output corresponding to one iteration of blocks 304 through 309, e.g., a recommendation depth of one. At block 310, the processor 107 determines whether to step deeper into the user-item diagram 200 to recommend an additional media item 202. With each additional increment of recommendation depth, an additional media item is potentially recommended to the target user 201a. The higher the recommendation depth, the higher the likelihood that media item(s) recommended to the target user 201a was previously unknown to the target user 201a. The recommendation depth thus affects the discoverability of new media items through recommendation.

In one embodiment, once a user 201 or media item 202 of the user-item diagram 200 has been selected by the processor 107 during a given iteration of procedure 300, the processor 107 cannot select that user 201 or media item 202 until another iteration of procedure 300 is initiated. In this way, redundant recommendations are avoided.

If the processor 107 determines at block 310 not to step deeper into the user-item diagram 200, then the processor 107 communicates a recommendation of the media item 202d to the target user 201a via the user device 110 over the network 109 and the procedure 300 ends. Alternatively, the processor 107 can communicate to the user device 110 recommendations of all the media items 202c, 202d, 202e, 202f, 202g, 202h, 202i, 202j, 202k, 202l, 202m, 202n encountered during procedure 300 (excluding the media items 202a and 202b rated by the target user 201a).

If the processor determines at block 310 to step deeper into the user-item diagram 200, then the processor 107 presents a recommendation of the media item 202d to the target user 201a and then repeats the procedures at blocks 304 through 309 to recommend an additional media item to the target user 201a.

In one embodiment, the processor 107 repeatedly performs the procedures of blocks 304 through 309 and outputs a subset of the media items selected by the processor 107 across multiple performances of the procedure of block 309. For example, the processor 107 performs the procedures of blocks 304 through 309 ten times resulting in ten potential media item recommendations, randomly recommends five out of the ten media items, and disregards the other five media items.

2. Additional Iterations

At block 311, the processor 107 determines whether to perform additional iterations of the procedure 300 for the target user 201*a* to identify additional media item recommendations and/or to improve the accuracy of the recommendations. If the processor 107 determines at block 311 not to perform additional iterations of the procedure 300 for the target user 201*a* then the procedure 300 ends.

If the processor 107 determines at block 311 to perform additional iterations of the procedure 300 for the target user 201*a* then the processor 107 repeats the procedures of blocks 301, 302, 303, 304, 305, 306, 307, 308, 309, 310, 311 to identify additional potential media item recommendations.

In one embodiment, the processor 107 records in the memory 106 identifiers of the media items selected at block 309 across multiple iterations of the procedure 300 and then determines which of the media items corresponding to the recorded identifiers to recommend to the target user 201*a*. The processor 107 outputs to the user device 110 a recommendation of the media item 203 corresponding to the identifier recorded in the memory 106 that has the highest frequency of occurrences across the iterations.

In yet another embodiment, the processor 107 computes the average media item rating of each media item having an identifier recorded in the memory 106 and outputs to the user device 110 a recommendation of the media item that corresponds to the highest average media item rating.

Alternatively, the processor 107 computes the average media item rating of each media item having an identifier recorded in the memory 106 and then adds weighting factors to the average media item ratings in proportion to their frequency of occurrence across the iterations. The processor 107 then outputs to the user device 110 a recommendation of the media item that has a media item rating having the highest weighted average media item rating.

In another aspect, the processor 107 computes the average media item rating of each media item having an identifier recorded in the memory 106 and then adds weighting factors to the average media item ratings in proportion to their distance, in recommendation depth, from the target user 201*a*. The processor 107 then outputs to the user device 110 a recommendation of the media item that has a media item rating having the highest weighted average media item rating.

In some embodiments, each user profile also includes user attributes, such as user age, user sex, user country, user region, user hometown, and/or the like. In this way, the processor 107 can weight item ratings as more relevant for a target user. For example, in one embodiment, each media item profile also includes a user age, and the processor 107 adds weighting factors to the rankings in proportion to the difference in age between the user and the target user 201*a*. In this way, media item recommendations are provided to the target user 201*a* by users who are close in age to the target user 201*a*.

In other embodiments, the user profile also includes rating data, such as a date that each media item was rated, a quantity of media items that have been rated by each user, etc. In this way, the processor 107 can deem more recent media item ratings as more relevant than older media item ratings by, e.g., adding a weight to each media item rating that is proportional to how recent the media item rating is. In particular, in one embodiment, the user profile also includes a date of ranking for each ranking, and the processor 107 adds weighting factors to the rankings in proportion to how recent the ranking is. In this way, older media item ratings, which may be less relevant to the target user 201*a*, are less likely to be relied upon for media item recommendations. The target user 201*a* is provided with media item recommendations of media items that have been more recently rated, and thus likely are more relevant to the preferences of the target user 201*a*.

V. Content-Based Recommendations

A. Overview

In general, the processor 107 provides content-based recommendations by identifying media items having media item attributes similar to the media item attribute preferences of a target user. If the target user indicates a preference for a particular media item attribute, then the processor 107 recommends media items having a high media item attribute strength for that particular media item attribute, e.g., media items that are strongly characterized by that attribute.

B. Item-Attribute Network

Figure 4:
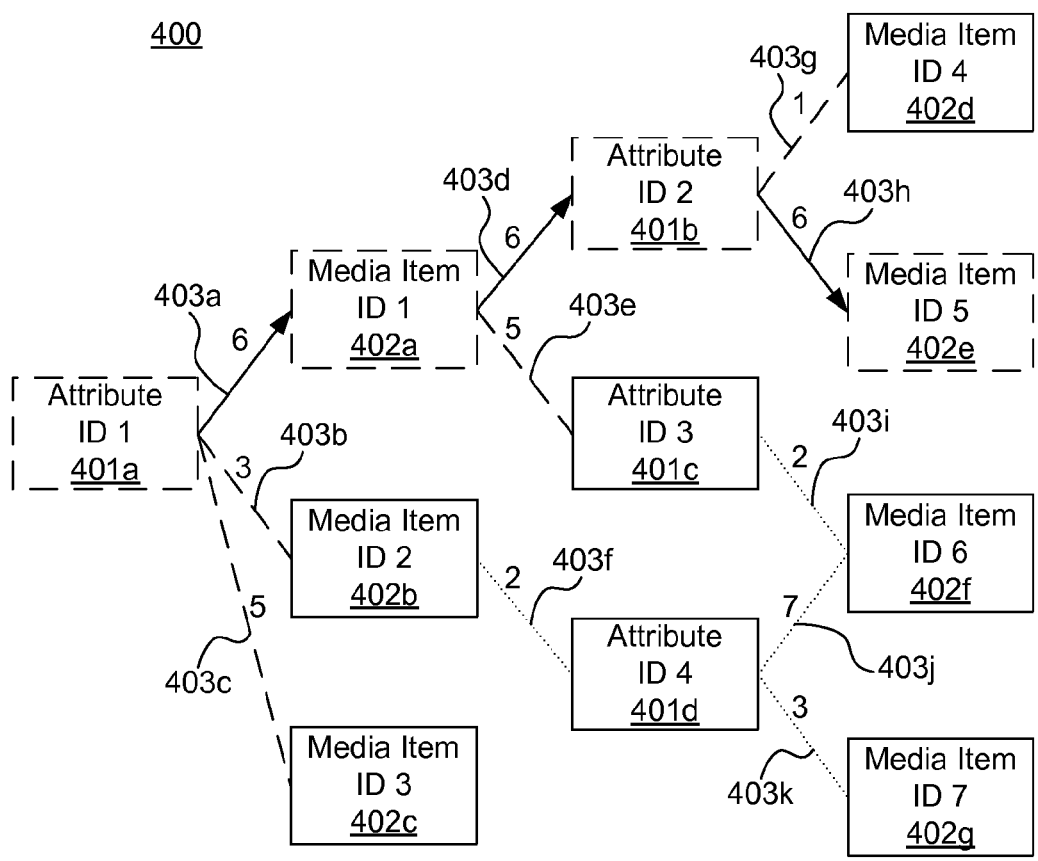
FIG. 4 is an item-attribute diagram illustrating information stored in an item-attribute database.

FIG. 4 is an item-attribute diagram illustrating information stored in an item-attribute database, such as the item-attribute database 104. As described above with respect to FIG. 1, the item-attribute database 104 includes media item profiles for each media item, with each media item profile having a corresponding unique media item identifier. An example of such a media item profile is shown below in Table 2.

TABLE 2

| Media Item ID 1 | |
| --- | --- |
| Media Item Attribute ID 1 | Media Item Rating Attribute Strength 1 |
| Media Item Attribute ID 2 | Media Item Rating Attribute Strength 2 |
| Media Item Attribute ID 3 | Media Item Rating Attribute Strength 3 |

Each media item profile associates a media item identifier of the corresponding media item with all of the corresponding media item attributes, as well as the media item attribute strength assigned to each media item attribute. These associations are illustrated in the item-attribute diagram 400 by links that connect media item identifiers 402*a*, 402*b*, 402*c*, 402*d*, 402*e*, 402*f*, 402*g* (collectively 402) to media item attribute identifiers 401*a*, 401*b*, 401*c*, 401*d* (collectively 401).

As described in further detail below with respect to FIG. 5, the solid-lined links in the item-attribute diagram 400 represent links to media item identifiers and media item attribute identifiers selected by the processor 107 during the implementation of procedure 500. The long-dashed links in the item-attribute diagram 400 represent links to media item identifiers and media item attribute identifiers retrieved, but not selected, by the processor 107 during the implementation of procedure 500. The short-dashed links in the item-attribute diagram 400 represent links to media item identifiers and media item attribute identifiers that have not been retrieved by the processor 107 during the implementation of procedure 500.

Adjacent to the links in the item-attribute diagram 400 are numbers that represent the media item attribute strengths 403*a*, 403*b*, 403*c*, 403*d*, 403*e*, 403*f*, 403*g*, 403*h*, 403*i*, 403*j*, 403*k* (collectively 403). The media item attribute strengths 403 illustrated in the item-attribute diagram 400 include degrees of randomization, as described in further detail above with respect to block 302 of FIG. 3.

As described above in connection with FIG. 1, each media item attribute denotes a characteristic of the media item and corresponds to a media item attribute category. Examples of media item attribute categories and attributes for music include cognitive attributes (e.g., simplicity, storytelling quality, melodic emphasis, vocal emphasis, speech like quality, strong beat, good groove, fast pace), emotional attributes (e.g., intensity, upbeatness, aggressiveness, relaxing, mellowness, sadness, romance, broken heart), aesthetic attributes (e.g., smooth vocals, soulful vocals, high vocals, sexy vocals, powerful vocals, great vocals), social behavioral attributes (e.g., easy listening, wild dance party, slow dancing, workout, shopping mall), genre attributes (e.g., alternative, blues, country, electronic/dance, folk, gospel, jazz, Latin, new age, R&B/soul, rap/hip hop, reggae, rock), sub-genre attributes (e.g., blues, gospel, motown, stax/memphis, philly, doo-wop, funk, disco, old school, blue-eyed soul, adult contemporary, quiet storm, crossover, dance/techno, electro/synth, new jack swing, retro/alternative, hip hop, rap), instrumental/vocal attributes (e.g., instrumental, vocal, female vocalist, male vocalist), backup vocal attributes (e.g., female vocalist, male vocalist), instrument attributes (e.g., most important instrument, second most important instrument), etc.

Examples of media item attribute categories and media item attributes for movies include genre (e.g., action, animation, children and family, classics, comedy, documentary, drama, faith and spirituality, foreign, high-definition, horror, independent, musicals, romance, science fiction, television, thrillers), release date (e.g., within past six months, within past year, 1980s), etc.

Other media item attribute categories and media item attributes are contemplated and are within the scope of the embodiments described herein.

C. Content-Based Recommendation Process

Figure 5:
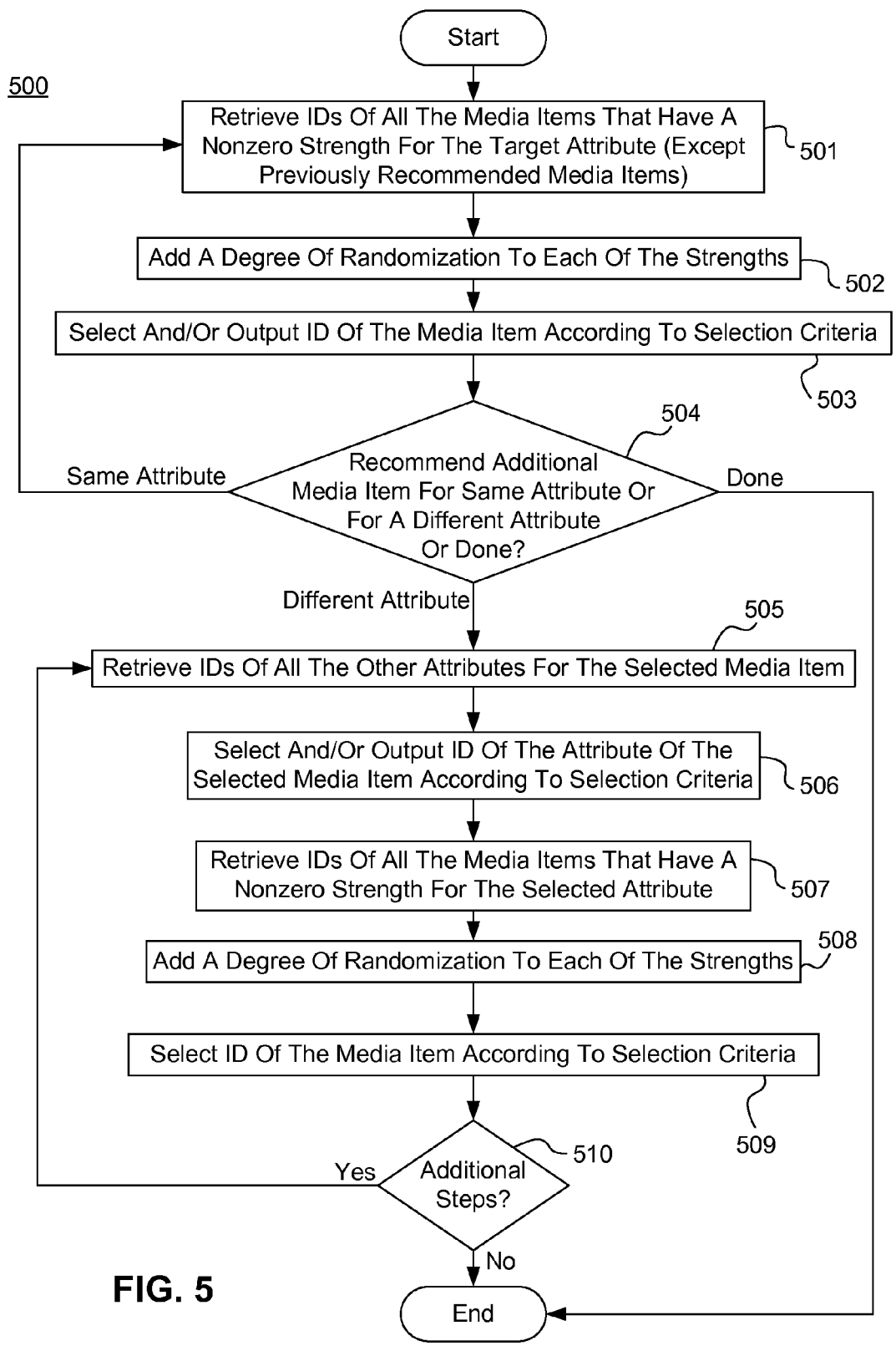
FIG. 5 is a flowchart diagram illustrating an exemplary procedure for providing a media item recommendation by using a network of media items and media item attributes.

FIG. 5 is a flowchart diagram illustrating an exemplary procedure 500 for providing a media item recommendation by using an item-attribute diagram, such as the item-attribute diagram 400. In general, the processor 107 implements the procedure 500 to provide content-based recommendations by identifying media item recommendations based on the associations between media item attributes of multiple media items.

Referring to FIGS. 1, 4, and 5, the procedure 500 begins with a target media item attribute 401a determined to be preferred by a target user (not shown). In one embodiment, the target media item attribute is selected by the target user via the user device 110 and input into the recommendation device 101 over the network 109. Alternatively, the target media item attribute 401a can be selected at random, or selected based on a recorded history of the media items preferred by the target user. In yet another embodiment, the target media item attribute(s) can be selected as the attribute(s) linked to a media item the target user is interested in.

Users and/or professional rating personnel input media item attribute strengths for media items via the user device 110 over the network 109. In one embodiment, the media item attribute strengths are selected on a scale of real-valued numbers or integers, such as a scale from one (denoting that the media item is not characterized by the media item attribute at all) to five (denoting that the media item is characterized by the media item attribute very much). In yet another aspect, the media item attribute strengths 403a, 403b, 403c, 403d, 403e, 403f, 403g, 403h, 403i, 403j, 403k (collectively 403) depicted in FIG. 4 are derived from averages of the media item attribute strengths that have been input on a scale of one to five by multiple users for each media item-attribute pair.

At block 501, the processor 107 retrieves identifiers of all the media items 402a, 402b, 402c that have a nonzero media item attribute strength 403a, 403b, 403c for the target media item attribute 401a.

At block 502, the processor 107 randomizes each of the media item attribute strengths 403a through 403c, as discussed above in further detail with respect to block 302 of FIG. 3. The example media item ratings 403 shown in FIG. 4 were selected by users from a scale of one to five and include degrees of randomization (not shown) ranging from zero to two. Thus, the randomized media item ratings 403 of FIG. 4 range from one to seven.

At block 503, the processor 107 selects an identifier of a media item according to predetermined selection criteria and outputs a recommendation of the media item to the user device 110 over the network 109. For example, if the highest media item attribute strength is used as the predetermined selection criteria, then the processor 107 selects an identifier of the media item 402a that corresponds to the highest of the randomized media item attribute strengths 403a, which is six in this case. In this way, the processor 107 identifies the media item 402a that is most strongly characterized by the target media item attribute 401a.

Alternatively, if the target media item attribute 401a was selected as being a media item attribute of a target media item (not shown), then the predetermined selection criteria may command the processor 107 to select an identifier of the media item having a media item attribute strength that is closest in value to the media item attribute strength of the target media item attribute 401a for the target media item. In this way, the processor 107 identifies the media item that is most similar to the target media item, in terms of the media item attribute strength of the target media item attribute 401a.

Block 504 represents multiple distinct embodiments. In one embodiment, after the processor 107 outputs to the user device 110 over the network 109 a recommendation of the media item corresponding to the identifier selected at block 503, the procedure 500 ends.

In another embodiment, blocks 501, 502, 503 of the procedure 500 are repeated to output to the user device 110 an additional media item recommendation according to the same target media item attribute 401a. In this case, at each iteration of the procedures of blocks 501 through 503, the processor 107 excludes the previously recommended media items from the item-attribute diagram 400 to avoid redundant recommendations.

In yet a further embodiment, the procedure 500 proceeds to block 505 to provide a recommendation of a media item according to a media item attribute that is distinct from the target media item attribute 401a. This procedure is sometimes also referred to as media item attribute-hopping. At block 505, the processor 107 retrieves identifiers of all the other media item attributes (excluding the target media item attribute 401a) and media item attribute strengths that correspond to the media item selected at block 503. For example, if the media item identifier 402a was selected at block 503 then the processor 107 retrieves all the identifiers of the media item attributes 401b and 401c and the media item attribute strengths 403d and 403e that correspond to the selected media item 402a.

At block 506, the processor 107 selects, for the media item 402a selected at block 503, an identifier of a media item attribute according to predetermined selection criteria. For example, if the highest media item attribute strength is used as the predetermined selection criteria, then the processor 107 selects an identifier of the media item attribute 401*b* that corresponds to the highest of the randomized media item attribute strengths 403*d*, which is six in this case. In this way, the processor 107 identifies the most distinguishing media item attribute 401*b* of the media item 402*a*.

Alternatively, if the target media item attribute 401*a* was selected as being a media item attribute of a target media item (not shown), then the predetermined selection criteria may command the processor 107 to select, at block 506, an identifier of the media item attribute having a media item attribute strength that is closest in value to the media item attribute strength of that media item attribute for the target media item. In this way, the processor 107 identifies the media item attribute for which the media item 402*a* selected at block 503 and the target media item have the most similar media item attribute strengths.

In another embodiment, at block 506, the predetermined selection criteria commands the processor 107 to select a media item attribute identifier in the same media item attribute category as the target media item attribute 401*a*. For example, if the target media item attribute category is genre and the target media item attribute 401*a* is rock, then the processor 107 can select at block 506 another media item attribute identifier within the genre category, such as southern rock.

In another aspect, at block 506, the predetermined selection criteria command the processor 107 to randomly select a media item attribute identifier. In this way, the processor 107 increases the variety of recommendations and promotes the discovery of new media items.

At block 507, the processor 107 retrieves all the identifiers of media items that have a nonzero media item attribute strength for the media item attribute that was selected at block 506.

At block 508, the processor 107 randomizes, as described above with respect to block 302 of FIG. 3, each of the media item attribute strengths corresponding to the media item identifiers that were retrieved at block 507.

At block 509, the processor 107 selects an identifier of a media item according to predetermined selection criteria and outputs a recommendation of the media item to the user device 110 over the network 109. For example, if the highest media item attribute strength is used as the predetermined selection criteria, then the processor 107 selects an identifier of the media item 402*e* that corresponds to the highest of the randomized media item attribute strengths 403*h*, which is six in this example. In this way, the processor 107 identifies the media item 402*e* that is most strongly characterized by the previous media item attribute 401*b*.

Alternatively, the predetermined selection criteria may command the processor 107 to select an identifier of the media item having a media item attribute strength of the media item attribute 401*b* that is closest in value to the media item attribute strength 403*d* of the media item attribute 401*b* for the previous media item 402*a*. In this way, the processor 107 identifies the media item 402*e* that is most similar to the previous media item 402*a*, in terms of the media item attribute strength of the media item attribute 401*b* under consideration.

Block 510 represents multiple distinct embodiments. In one embodiment, after the processor 107 outputs to the user device 110 over the network 109 a recommendation of the media item corresponding to the identifier selected at block 509, the procedure 500 is complete. In another embodiment, blocks 505, 506, 507, 508, 509 of the procedure 500 are repeated to output an additional media item recommendation by using an additional media item attribute.

In yet another aspect, the additional iterations of the procedure 500 are performed for the target media item attribute 401*a* to analyze and identify additional potential media item recommendations. In this case, the processor 107 records in the memory 106 the media item identifiers selected at blocks 503 and/or 509, as the case may be, across multiple iterations of the procedure 500 and then determines which of the corresponding media items to recommend to the user device 110.

In some embodiments, the processor 107 outputs to the user device 110 a recommendation of the media item having an identifier recorded in the memory 106 that has the highest frequency of occurrences across the iterations.

Alternatively, the processor 107 computes the average media item attribute strength of each media item attribute having an identifier recorded in the memory 106 and outputs to the user device 110 a recommendation of the media item based on the media item attribute that has the highest average media item attribute strength.

In yet another aspect, the processor 107 computes the average media item attribute strength of each media item attribute having an identifier recorded in the memory 106 and then adds weighting factors to the average media item attribute strengths in proportion to their frequency of occurrence across the iterations. The processor 107 outputs to the user device 110 a recommendation of the media item having a media item attribute strength equal to the weighted average media item attribute strength.

VI. Exemplary Computer Readable Medium Implementation

The example embodiments described above such as, for example, the system 100, the diagrams 200, 400, the procedures 300, 500, or any part(s) or function(s) thereof, may be implemented by using hardware, software or a combination thereof and may be implemented in one or more computer systems or other processing systems. However, the manipulations performed by these example embodiments were often referred to in terms, such as entering, which are commonly associated with mental operations performed by a human operator. No such capability of a human operator is necessary in any of the operations described herein. For example, the recommendation device 101 may automatically recommend programs without receiving a user's input through the user device 110. In other words, the operations may be completely implemented with machine operations. Useful machines for performing the operation of the example embodiments presented herein include general purpose digital computers or similar devices.

Figure 6:
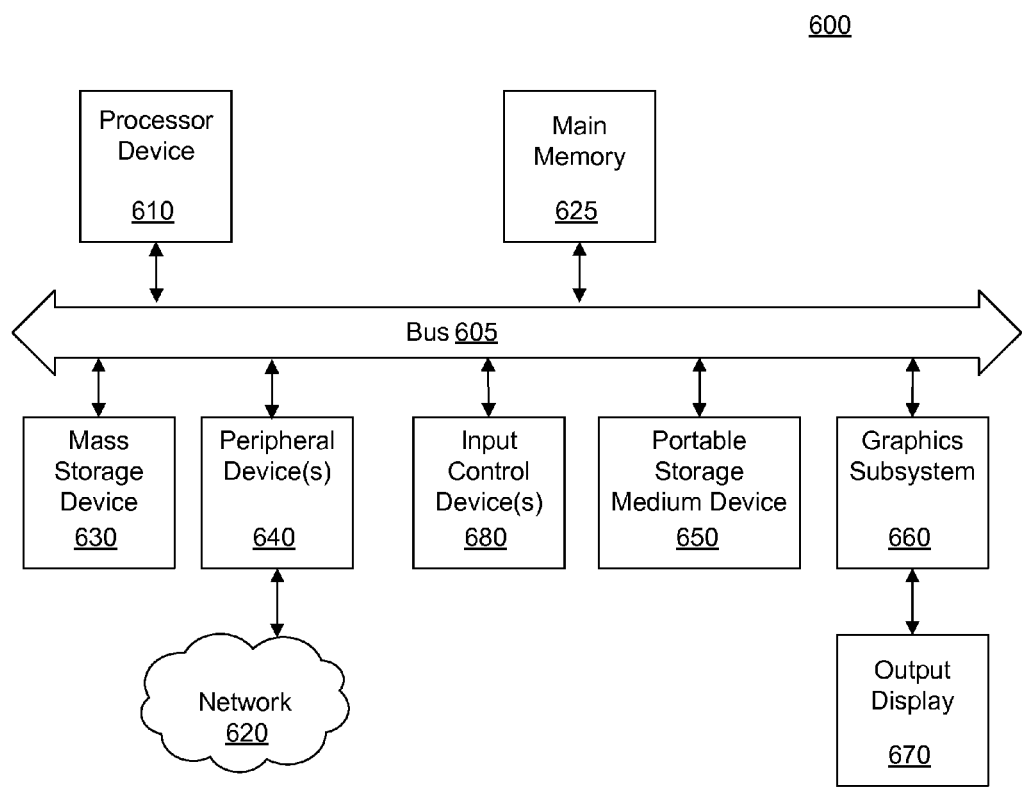
FIG. 6 is a block diagram of a general and/or special purpose computer system, in accordance with some embodiments.

FIG. 6 is a high-level block diagram of a general and/or special purpose computer system 600, in accordance with some embodiments. The computer system 600 may be, for example, a user device, a user computer, a client computer and/or a server computer, among other things.

The computer system 600 preferably includes without limitation a processor device 610, a main memory 625, and an interconnect bus 605. The processor device 610 may include without limitation a single microprocessor, or may include a plurality of microprocessors for configuring the computer system 600 as a multi-processor system. The main memory 625 stores, among other things, instructions and/or data for execution by the processor device 610. If the system is partially implemented in software, the main memory 625 stores the executable code when in operation. The main memory 625 may include banks of dynamic random access memory (DRAM), as well as cache memory.

The computer system 600 may further include a mass storage device 630, peripheral device(s) 640, portable storage medium device(s) 650, input control device(s) 680, a graphics subsystem 660, and/or an output display 670. For explanatory purposes, all components in the computer system 600 are shown in FIG. 6 as being coupled via the bus 605. However, the computer system 600 is not so limited. Devices of the computer system 600 may be coupled through one or more data transport means. For example, the processor device 610 and/or the main memory 625 may be coupled via a local microprocessor bus. The mass storage device 630, peripheral device(s) 640, portable storage medium device(s) 650, and/or graphics subsystem 660 may be coupled via one or more input/output (I/O) buses. The mass storage device 630 is preferably a nonvolatile storage device for storing data and/or instructions for use by the processor device 610. The mass storage device 630 may be implemented, for example, with a magnetic disk drive or an optical disk drive. In a software embodiment, the mass storage device 630 is preferably configured for loading contents of the mass storage device 630 into the main memory 625.

The portable storage medium device 650 operates in conjunction with a nonvolatile portable storage medium, such as, for example, a compact disc read only memory (CD-ROM), to input and output data and code to and from the computer system 600. In some embodiments, the software for storing an internal identifier in metadata may be stored on a portable storage medium, and may be inputted into the computer system 600 via the portable storage medium device 650. The peripheral device(s) 640 may include any type of computer support device, such as, for example, an input/output (I/O) interface configured to add additional functionality to the computer system 600. For example, the peripheral device(s) 640 may include a network interface card for interfacing the computer system 600 with a network 620.

The input control device(s) 680 provide a portion of the user interface for a user of the computer system 600. The input control device(s) 680 may include a keypad and/or a cursor control device. The keypad may be configured for inputting alphanumeric and/or other key information. The cursor control device may include, for example, a mouse, a trackball, a stylus, and/or cursor direction keys. In order to display textual and graphical information, the computer system 600 preferably includes the graphics subsystem 660 and the output display 670. The output display 670 may include a cathode ray tube (CRT) display and/or a liquid crystal display (LCD). The graphics subsystem 660 receives textual and graphical information, and processes the information for output to the output display 670.

Each component of the computer system 600 may represent a broad category of a computer component of a general and/or special purpose computer. Components of the computer system 600 are not limited to the specific implementations provided here.

Portions of the invention may be conveniently implemented by using a conventional general purpose computer, a specialized digital computer and/or a microprocessor programmed according to the teachings of the present disclosure, as will be apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the processes of the invention. The storage medium may include without limitation a floppy disk, a mini disk, an optical disc, a Blu-ray Disc, a DVD, a CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer readable medium or media, some implementations include software for controlling both the hardware of the general and/or special computer or microprocessor, and for enabling the computer or microprocessor to interact with a human user or other mechanism utilizing the results of the invention. Such software may include without limitation device drivers, operating systems, and user applications. Ultimately, such computer readable media further includes software for performing aspects of the invention, as described above.

Included in the programming and/or software of the general and/or special purpose computer or microprocessor are software modules for implementing the processes described above.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

The invention claimed is:

1. A method for providing a recommendation of a media item to a target user, the method comprising steps of:
    retrieving, from a database, an identifier of a first media item rated by a target user;
    retrieving, from the database, user identifiers of users having provided media item ratings for the first media item and the media item ratings provided by the users, correspondingly;
    randomizing each of the media item ratings using a computer processor, resulting in randomized media item ratings, wherein randomizing includes applying a random number to each of the media item ratings by performing an arithmetical calculation;

selecting, from the user identifiers, a user identifier corresponding to a highest value of the randomized media item ratings;

retrieving, from the database, additional media item ratings associated with the selected user identifier;

randomizing each of the additional media item ratings using a computer processor, resulting in additional randomized media item ratings, wherein randomizing includes applying a random number to each of the additional media item ratings by performing an arithmetical calculation;

selecting an identifier of a recommended media item corresponding to a highest value of the randomized media item ratings and the additional randomized media item ratings; and transmitting, to a user device over a network, metadata associated with the recommended media item.

2. The method of claim 1, further comprising:

identifying a plurality of media item recommendations for the target user, wherein the plurality of media item recommendations correspond to a plurality of media items;

computing, for each of the plurality of media items, a total number of occurrences of the media item within the plurality of media items; and transmitting, to the user device, a media item recommendation of one of the plurality of media items corresponding to a highest value of the total numbers of occurrences.

3. The method of claim 1, further comprising:

receiving, from the user device over the network, at least one of a media item rating and a request for a media item recommendation.

4. The method of claim 1, further comprising:

identifying a plurality of recommended media items for the target user by performing a plurality of iterations of at least one of the steps of claim 1;

selecting an identifier of one of the plurality of recommended media items; and transmitting, to the user device, metadata associated with the selected one of the plurality of recommended media items, wherein the selected user identifiers and media item identifiers are eligible to be selected repeatedly within each iteration.

5. A system for providing a recommendation of a media item to a target user, the system, comprising:

at least one processor configured to:

retrieve, from a database, an identifier of a first media item rated by a target user;

retrieve, from the database, user identifiers of users having provided media item ratings for the first media item and the media item ratings provided by the users, correspondingly;

randomize each of the media item ratings, resulting in randomized media item ratings, wherein randomizing includes applying a random number to each of the media item ratings by performing an arithmetical calculation;

select, from the user identifiers, a user identifier corresponding to a highest value of the randomized media item ratings;

retrieve, from the database, additional media item ratings associated with the selected user identifier;

randomize each of the additional media item ratings, resulting in additional randomized media item ratings, wherein randomizing includes applying a random number to each of the additional media item ratings by performing an arithmetical calculation;

select an identifier of a recommended media item corresponding to a highest value of the randomized media item ratings and the additional randomized media item ratings; and transmit, to a user device over a network, metadata associated with the recommended media item.

6. The system of claim 5, wherein the at least one processor is further operable to:

identify a plurality of media item recommendations for the target user, the plurality of media item recommendations corresponding to a plurality of media items;

compute, for each of the plurality of media items, a total number of occurrences of the media item within the plurality of media items; and transmit, to the user device, a media item recommendation of one of the plurality of media items corresponding to a highest value of the total numbers of occurrences.

7. The system of claim 5, wherein the at least one processor is further operable to:

receive, from the user device over the network, at least one of a media item rating and a request for a media item recommendation.

8. The system of claim 5, wherein the at least one processor is further operable to:

identify a plurality of recommended media items for the target user by performing a plurality of iterations of at least one of the steps of claim 5;

select an identifier of one of the plurality of recommended media items; and transmit, to the user device, metadata associated with the selected one of the plurality of recommended media items, wherein the selected user identifiers and media item identifiers are eligible to be selected repeatedly within each iteration.

9. A non-transitory computer-readable medium having stored thereon sequences of instructions, the sequences of instructions including instructions, which, when executed by a processor, cause the processor to perform:

retrieving, from a database, an identifier of a first media item rated by a target user;

retrieving, from the database, user identifiers of users having provided media item ratings for the first media item and the media item ratings provided by the users, correspondingly;

randomizing each of the media item ratings, resulting in randomized media item ratings, wherein randomizing includes applying a random number to each of the media item ratings by performing an arithmetical calculation;

selecting, from the user identifiers, a user identifier corresponding to a highest value of the randomized media item ratings;

retrieving, from the database, additional media item ratings associated with the selected user identifier;

randomizing each of the additional media item ratings, resulting in additional randomized media item ratings, wherein randomizing includes applying a random number to each of the additional media item ratings by performing an arithmetical calculation;

selecting an identifier of a recommended media item corresponding to a highest value of the randomized media item ratings and the additional randomized media item ratings; and transmitting, to a user device over a network, metadata associated with the recommended media item.

10. The computer-readable medium according to claim 9, further having stored thereon a sequence of instructions, which, when executed by the processor, cause the processor to perform:

identifying a plurality of media item recommendations for the target user, wherein the plurality of media item recommendations correspond to a plurality of media items;

computing, for each of the plurality of media items, a total number of occurrences of the media item within the plurality of media items; and transmitting, to the user device, a media item recommendation of one of the plurality of media items corresponding to a highest value of the total numbers of occurrences.

11. The computer-readable medium according to claim 9, further having stored thereon a sequence of instructions, which, when executed by the processor, cause the processor to perform:

receiving, from the user device over the network, at least one of a media item rating and a request for a media item recommendation.

12. The computer-readable medium according to claim 9, further having stored thereon a sequence of instructions, which, when executed by the processor, cause the processor to perform:

identifying a plurality of recommended media items for the target user by performing a plurality of iterations of at least one of the steps of claim 9;

selecting an identifier of one of the plurality of recommended media items; and transmitting, to the user device, metadata associated with the selected one of the plurality of recommended media items, wherein the selected user identifiers and media item identifiers are eligible to be selected repeatedly within each iteration.

\* \* \* \* \*